(12) United States Patent
Donauer et al.

(10) Patent No.: US 6,725,824 B2
(45) Date of Patent: Apr. 27, 2004

(54) INTERNAL COMBUSTION ENGINE

(75) Inventors: Georg Donauer, Friedrichshafen (DE); Arne Schneemann, Meckenbeuren (DE); Ralf Speetzen, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/297,838

(22) PCT Filed: Apr. 9, 2002

(86) PCT No.: PCT/EP02/03908
§ 371 (c)(1),
(2), (4) Date: May 20, 2003

(87) PCT Pub. No.: WO02/099258
PCT Pub. Date: Dec. 12, 2002

(65) Prior Publication Data
US 2003/0183192 A1 Oct. 2, 2003

(30) Foreign Application Priority Data
Apr. 11, 2001 (DE) .......................... 101 18 315

(51) Int. Cl.$^7$ .................................. F02B 19/00
(52) U.S. Cl. ................ 123/255; 123/275; 123/280
(58) Field of Search ................ 123/255, 275, 123/280, 670

(56) References Cited

U.S. PATENT DOCUMENTS

| 4,223,645 A | * 9/1980 | Nohira et al. ........... 123/292 |
| 4,426,966 A | 1/1984 | Huether et al. |
| 4,559,911 A | 12/1985 | Bodine |
| 4,784,098 A | * 11/1988 | Artman ................. 123/262 |

FOREIGN PATENT DOCUMENTS

| EP | 0771940 A1 | 5/1997 |
| JP | 63-159615 | 7/1988 |

* cited by examiner

Primary Examiner—John Kwon
(74) Attorney, Agent, or Firm—Crowell & Moring LLP

(57) ABSTRACT

An internal combustion engine includes a compression chamber that is delimited by fixed housing walls and a movable piston mounted therein, and a porous component that fills the combustion chamber, which is separate from the compression chamber. The combustion of fuel and air takes place exclusively within the porous component. The compression chamber is connected to the combustion chamber only via an overflow cross-section designed to allow the transfer of combustion gases created during combustion from the combustion chamber into the compression chamber.

20 Claims, 1 Drawing Sheet

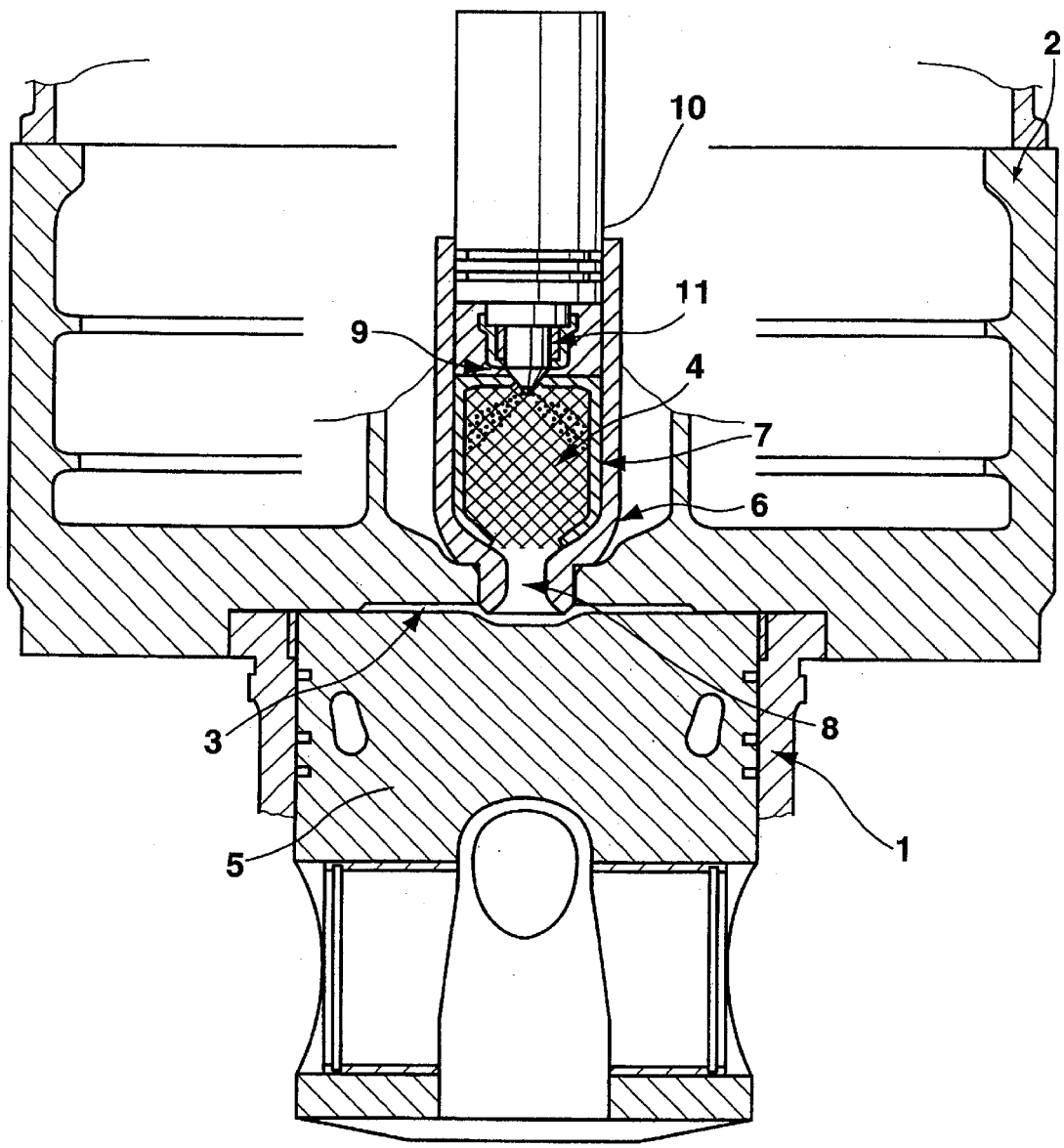

INTERNAL COMBUSTION ENGINE

BACKGROUND AND SUMMARY OF THE INVENTION

This invention relates to an internal combustion engine comprising a compression chamber that is delimited by fixed housing walls and a movable piston mounted therein, and a porous component in which the combustion of fuel and air takes place.

From German publications DE 199 00 231 A1 and DE 197 63 407 C2, internal combustion engines that are equipped with a compression and combustion chamber that is formed by fixed housing walls and a movable piston mounted therein are known; fuel and air are fed into this chamber to allow combustion. A gas-permeable, porous component is mounted within the compression and combustion chamber, and provides the location in which the combustion of the fuel essentially takes place. The porous component in these known-in-the-art internal combustion engines is to be positioned either in a depression formed in the top of the piston or on the fixed housing walls of the compression and combustion chamber.

German Published Application 24 16 804 discloses an internal combustion piston engine, which is equipped with a chamber that is separate from the main combustion chamber. This special, separate chamber may also be positioned in a prechamber in the cylinder head. A gas-permeable structure placed in the separate chamber is designed to effect a preparation of the injected fuel, and to improve the combustion. However, the compression chamber formed by the piston and the cylinder still serves as the main combustion chamber.

In internal combustion engines in which the combustion of fuel and air takes place largely in a porous component positioned within the compression chamber or adjacent and open to this chamber, the difficulty exists that a strong inflow of heat will occur through the porous component into the compression chamber, and thus also into the fresh gas, due to large heat exchange surfaces. This results in a lower fresh gas charge, increased compression work, and a worsening of the efficiency of the internal combustion engine. Other disadvantages include increased thermal and mechanical strain on the components of the internal combustion engine in the area of the compression chamber.

One object of the invention is to produce an improved internal combustion engine of the type described above.

This object is attained pursuant to the invention. Advantageous further developments of the internal combustion engine are also described.

With the invention, an internal combustion engine including a compression chamber delimited by fixed housing walls and a movable piston arranged therein, and a porous component in which the combustion of fuel and air takes place, is provided. The porous component is arranged within a combustion chamber, which is separate from the compression chamber up to an overflow cross section for the overflow of the combustion gases from the combustion chamber into the compression chamber, whereby the overflow cross-section is substantially smaller than the cross-sectional surface of the combustion chamber. According to the invention, the combustion of the fuel that is injected into the combustion chamber takes place almost exclusively within the combustion chamber, which is filled completely by the porous component, while the compression chamber does not represent a combustion chamber at all.

One basic advantage of the internal combustion engine of the invention is that low-toxic emission combustion can be achieved. In order to prevent the disadvantageous effect of thermal inflow from the porous component, which represents a hot component, the chambers are nearly completely separated, and the size of the overflow cross-section is limited to the greatest extent possible. Thus, during gas exchange, and during compression, a basically lower heat influx into the fresh gas takes place, combined with better fresh gas charging and a higher efficiency for the internal combustion motor. Another advantage is lower thermal and mechanical strain on the internal combustion engine in the area of the compression chamber.

A preferred embodiment of the invention provides that the overflow cross-section be formed by an overflow nozzle, to which the combustion chamber tapers in the direction of the flow of combustion gas. One advantage of this embodiment is that the overflow cross-section of the overflow nozzle is small, resulting in lower thermal inflow in the direction of the compression chamber, without substantial pressure losses resulting in combustion gases flowing over from the combustion chamber into the compression chamber.

The combustion chamber is preferably circular in its cross-section, and is most preferably cylindrical in shape.

The overflow nozzle also is preferably circular in cross-section.

The combustion chamber and the overflow nozzle together preferably form a single component.

According to a particularly advantageous embodiment, the component that forms the combustion chamber and the overflow nozzle, including the porous component, is separately replaceable. This presents an advantage in terms of low maintenance costs for the internal combustion engine.

According to one preferred embodiment of the invention, a fuel injector for injecting the fuel into the combustion chamber is provided.

Preferably, the fuel can be injected directly into the porous component via an injection nozzle in the fuel injector.

According to a preferred embodiment of the invention, the injection nozzle of the fuel injector is positioned opposite the overflow cross-section or the overflow nozzle in the combustion chamber.

The fuel injector preferably projects into the combustion chamber at the end that is opposite the overflow cross-section or the overflow nozzle.

According to a preferred embodiment of the invention, the porous component is mounted within the combustion chamber via a clamping device, wherein the injection nozzle of the fuel injector projects into the combustion chamber or into the porous component through an opening in the clamping device.

According to a particularly preferred embodiment of the invention, the combustion chamber, together with the porous component and the fuel injector, forms a replaceable module. This, again, represents an advantage in terms of low maintenance costs for the internal combustion engine.

A thermally insulated layer is preferably positioned between the porous component and the inner wall of the combustion chamber.

According to a particularly preferred embodiment of the invention, the combustion chamber that houses the porous component is mounted in the cylinder head of the internal combustion engine.

Most preferably, the combustion chamber is centrally positioned, relative to the piston, within the cylinder head of the internal combustion engine.

The overflow cross-section is preferably only as large as is necessary to prevent pressure losses in the overflow of the gases to the greatest possible extent.

An embodiment of the invention will be described in greater detail on the basis of the drawing figure.

BRIEF DESCRIPTION OF THE DRAWING

The drawing FIGURE shows a lateral, sectional view of a section of an internal combustion engine, which represents a compression and combustion chamber that is delimited by fixed housing walls and a movable piston arranged therein, and a porous component that is arranged in a separate combustion chamber, combustion of fuel and air taking place within the component, in accordance with an embodiment of the invention.

DETAILED DESCRIPTION OF THE INVENTION

The drawing FIGURE shows a cross-sectional view of part of an internal combustion engine in the form of a lifting cylinder engine having a compression chamber 3, which is formed by fixed housing walls 1, 2 and a movable piston 5. The fixed housing walls 1, 2 are formed by a cylinder 1 that guides the piston 5, and a cylinder head 2. A fuel injector 10 serves to inject fuel, which is burned, together with combustion air that is also fed to the engine, in the operation of the internal combustion engine.

A combustion chamber 6 is provided arranged separate from the compression chamber 3 in which a porous component 4 is provided in which the combustion of fuel and air takes place. The porous component 4 fills the combustion chamber 6 almost completely. The volume of the porous component 4 is dimensioned such that sufficient air can be present for the entire amount of fuel that has been injected into the porous component 4 to be burned within the porous component 4. The combustion chamber 6 is the sole combustion chamber. The combustion chamber 6 is designed to be separate from the compression chamber 3 up to an overflow cross-section, which has the form of an overflow nozzle 8. The overflow nozzle 8 serves to transfer the combustion gases that are created during combustion from the combustion chamber 6 into the compression chamber 3. The cross-section of the overflow nozzle 8 is substantially smaller than the cross-sectional surface of the combustion chamber 6. The combustion chamber 6, which is circular in cross-section and in its basic form is essentially cylindrical, tapers as illustrated, for example, in the direction of the combustion gases that flow to the compression chamber 3, forming an overflow nozzle 8. The overflow nozzle 8 is also circular in cross-section. The overflow cross-section is designed such that in the transfer of combustion gases no pressure losses are experienced. Since no combustion takes place within the compression chamber 3, it is not necessary, as with traditional fuel injection systems, to achieve an efficient flow design with narrowly contoured nozzle openings in order to utilize the compression chamber as completely as possible for effective combustion. Since, according to the invention, combustion is almost entirely completed within the porous component, only a transfer of the gas with the lowest possible losses, and without a special flow design, is necessary. The overflow cross-section may also be formed by a number of preferably symmetrically positioned nozzle openings.

As is apparent in the drawing FIGURE, the combustion chamber 6 and the overflow nozzle 8 are designed to form a single component. This component, which includes the combustion chamber 6 and the overflow nozzle 8, including the porous component 4 held within the combustion chamber 6, is separately replaceable.

The component that forms the combustion chamber 6 and the overflow nozzle 8 is made of a highly heat-resistant material.

A thermally insulating layer 7 is positioned between the porous component 4 and the inner wall of the combustion chamber 6.

The fuel injector 10 that injects the fuel injector projects into the combustion chamber 6 at the end opposite the overflow nozzle 8, and the injection nozzle 11 of the fuel injector 10 is arranged such that it injects the fuel directly into the porous component 4 at the end that is opposite the overflow nozzle 8. The essential distance between the porous component and the fuel injector is kept as small as possible. The fuel that is injected into the porous component 4 ignites therein and burns, together with combustion air that is forced into the combustion chamber 6 as a result of compression from the compression chamber 3. The combustion gases that are created by the combustion then are transferred via the overflow nozzle 8 into the compression chamber 3, exerting an expanding force on the piston 5 with a power stroke of the internal combustion engine.

The porous component 4 is held within the combustion chamber 6 via a clamping device 9. An opening is included in the clamping device 9, through which the injection nozzle 11 of the fuel injector 10 projects into the combustion chamber 6 or into the porous component 4.

The combustion chamber 6, together with the porous component 4 and the fuel injector 10, form a replaceable module, which can be installed and removed without removal of the cylinder head 2.

As is clearly illustrated here, the combustion chamber 6 is positioned centrally relative to the piston 5 within the cylinder head 2.

What is claimed is:

1. An internal combustion engine comprising:
    a compression chamber that is delimited by fixed housing walls and a piston arranged so as to be movable therein, and
    a porous component in which combustion of fuel and air takes place, the porous component being held within a separate combustion chamber,
    wherein the compression chamber is connected to the combustion chamber via an overflow cross-section, via which combustion gases created during combustion are transferred from the combustion chamber into the compression chamber,
    wherein the overflow cross-section is smaller than the cross-sectional surface of the combustion chamber,
    wherein the porous component almost completely fills the combustion chamber, and
    wherein combustion takes place almost exclusively within the combustion chamber.

2. The internal combustion engine according to claim 1, wherein the overflow cross-section is formed by an overflow nozzle, toward which the combustion chamber tapers in the direction of the flow of combustion gases.

3. The internal combustion engine according to claim 2, wherein the overflow nozzle is circular in cross-section.

4. The internal combustion engine according to claim 2, wherein the combustion chamber and the overflow nozzle together form a single, one-piece component.

5. The internal combustion engine according to claim 4, wherein the component that forms the combustion chamber and the overflow nozzle, including the porous component, is designed as a replaceable module.

6. The internal combustion engine according to claim 1, wherein the combustion chamber is circular in cross-section.

7. The internal combustion engine according to claim 6, wherein the combustion chamber is cylindrical.

8. The internal combustion engine according to claim 1, and further comprising a fuel injector provided for injecting fuel into the combustion chamber.

9. The internal combustion engine according to claim 8, wherein the fuel injector has an injection nozzle, via which the fuel can be injected directly into the porous component.

10. The internal combustion engine according to claim 9, wherein the injection nozzle of the fuel injector is arranged within the combustion chamber opposite the overflow cross-section.

11. The internal combustion engine according to claim 10, wherein the porous component is held within the combustion chamber via a clamping device, and wherein the injection nozzle of the fuel injector projects into at least one of the combustion chamber and the porous component via an opening in the clamping device.

12. The internal combustion engine according to claim 8, wherein the fuel injector projects into the combustion chamber at the end opposite the overflow cross-section.

13. The internal combustion engine according to claim 12, wherein the porous component is held within the combustion chamber via a clamping device, and wherein the injection nozzle of the fuel injector projects into at least one of the combustion chamber and the porous component via an opening in the clamping device.

14. The internal combustion engine according to claim 8, wherein the combustion chamber, together with the porous component and the fuel injector, form a replaceable module.

15. The internal combustion engine according to claim 1, and further comprising a thermally insulating layer provided between the porous component and the inner wall of the combustion chamber.

16. The internal combustion engine according to claim 1, wherein the combustion chamber that houses the porous component is provided in the cylinder head of the internal combustion engine.

17. The internal combustion engine according to claim 16, wherein the combustion chamber is centrally arranged relative to the piston in the cylinder head of the internal combustion engine.

18. The internal combustion engine according to claim 1, wherein the combustion chamber has a substantially smaller cross-sectional surface than the compression chamber.

19. The internal combustion engine according to claim 1, wherein the porous component has a volume which is designed to allow a complete combustion of the injected fuel inside the combustion chamber.

20. The internal combustion engine according to claim 1, wherein the overflow cross-section is equipped with at least one opening to allow a largely loss-free transfer of the combustion gases.

* * * * *